(12) United States Patent
Cutler et al.

(10) Patent No.: US 6,897,182 B2
(45) Date of Patent: May 24, 2005

(54) CATALYST FOR PURIFYING EXHAUST GASES

(75) Inventors: Willard A. Cutler, Big Flats, NY (US); J. Paul Day, Big Flats, NY (US); Shahid G. Lakhwani, Painted Post, NY (US); Steven B. Ogunwumi, Corning, NY (US)

(73) Assignee: Corning Incorporated, Corning, NY (US)

( * ) Notice: Subject to any disclaimer, the term of this patent is extended or adjusted under 35 U.S.C. 154(b) by 185 days.

(21) Appl. No.: 10/002,343

(22) Filed: Oct. 25, 2001

(65) Prior Publication Data

US 2002/0081255 A1 Jun. 27, 2002

Related U.S. Application Data

(60) Provisional application No. 60/246,483, filed on Nov. 6, 2000.

(51) Int. Cl.$^7$ ................................................. B01J 29/06
(52) U.S. Cl. ....................... 502/302; 502/303; 502/304; 502/328; 502/330; 502/339; 502/340; 502/344
(58) Field of Search .......................... 502/64, 302, 303, 502/304, 328, 330, 339, 340, 344

(56) References Cited

U.S. PATENT DOCUMENTS

| | | | |
|---|---|---|---|
| 3,922,235 A | * | 11/1975 | DeLuca et al. |
| 4,327,188 A | | 4/1982 | Endo et al. |
| 4,350,613 A | | 9/1982 | Nishino et al. |
| 4,740,408 A | | 4/1988 | Mochida et al. |
| 4,915,887 A | | 4/1990 | Day et al. |
| 5,082,820 A | | 1/1992 | Mitsui et al. |
| 5,106,802 A | | 4/1992 | Horiuchi et al. |
| 5,948,376 A | | 9/1999 | Miyoshi et al. |
| 6,245,307 B1 | | 6/2001 | Inui et al. |

FOREIGN PATENT DOCUMENTS

| | | | |
|---|---|---|---|
| JP | 61-54238 | * | 3/1986 |
| JP | 4-87625 | | 3/1992 |
| JP | 10-165817 | | 6/1998 |

OTHER PUBLICATIONS

Qian et al., "Effects of Excess Alumina on Microstructure of Aluminum Titanate Ceramics Prepared From Mixture of Alumina and Titania", Yogyo–Kyokai Shi, 93(6), 1985, p. 1–12.

* cited by examiner

Primary Examiner—Christina Johnson
(74) Attorney, Agent, or Firm—Anca C. Gheorghiu

(57) ABSTRACT

A catalyst for purification of exhaust gases including (1) a catalysis-promoting coating comprising a noble metal catalyst and a NOx storage component loaded onto a carrier material, wherein the NOx storage component comprises an alkali metal and, (2) a ceramic substrate for supporting the catalysis-promoting coating, wherein the ceramic substrate exhibits resistance to alkali metal migration below 1000° C. and a coefficient of thermal expansion of less than about $25 \times 10^{-7}/°$ C. (25–800° C.). A second aspect of, the invention is a process for purifying an exhaust gas from a lean burn engine involving simultaneously removing carbon monoxide, hydrocarbons and nitrogen oxides by bringing the exhaust gas from a lean burn engine into contact with the exhaust gas purifying catalyst of the present invention disclosed above. In this process a majority of the nitrogen oxides in the exhaust gas are adsorbed to the NOx storage component on the porous support under a lean burn atmosphere in which oxidizing concentrations are above a stoichiometric point that is required for oxidizing components to be oxidized in the exhaust gas. Furthermore, when the exhaust gas is temporarily change from lean burn to fuel-rich, the adsorbed nitrogen oxides are released and chemically reduced by a reaction with the hydrocarbons and carbon monoxide in the exhaust gas under a stoichiometric atmosphere or a fuel-rich atmosphere in which oxygen concentrations are below stoichiometric point.

3 Claims, 4 Drawing Sheets

CATALYST FOR PURIFYING EXHAUST GASES

This application claims the benefit of U.S. Provisional Application No. 60/246,483 filed Nov. 6, 2000, entitled "Catalyst for Purifying Exhaust Gases", by Cutler et al.

BACKGROUND OF THE INVENTION

The present invention relates to a catalyst, and associated method, for purifying exhaust gases. More particularly, it relates to the catalyst, and associated method, for efficiently purifying nitrogen oxides in the exhaust gases whose oxygen concentrations are at the stoichiometric point or more than that required for oxidizing carbon monoxide and hydrocarbons therein.

Catalysts are employed in the exhaust systems of automotive vehicles to convert carbon monoxide, hydrocarbon and nitrogen oxides ($NO_x$) produced during engine operation into more desirable gases. When the engine is operated in a stoichiometric or slightly rich air/fuel ratio, i.e., a low oxygen concentration and an A/F ratio below about 14.6, catalyst containing palladium or platinum are able to efficiently convert all three gases simultaneously. That is, the carbon monoxide and hydrocarbons are oxidized to carbon dioxide and water and the NOx is reduced to nitrogen. Hence, such catalysts are referred to as "three-way" catalysts. A well known example of the three way catalyst is composed of a heat-resistant substrate of cordierite or the like and a porous support layer of gamma-alumina, which supports noble metals such as platinum, rhodium or the like.

The fuel economy of internal combustion engines is becoming an issue of concern because of the high volume of $CO_2$ emitted and also because of the rapid consumption of valuable oil reserves. These concerns are leading to stiffer requirements for fuel economy and reduced emissions. The gasoline direct injection (GDI) engine is one approach to addressing these problems, whereby the engine is operated very lean for most of the duty cycle. Under this "lean-burn" condition the A/F ratio is greater than about 14.6, i.e., resulting in a high oxygen concentration. While the aforementioned conventional three way catalysts can oxidize or reduce carbon monoxide, hydrocarbon and nitrogen oxides to purify exhaust gases when the air-fuel mixture is at the stoichiometric air-fuel ratio, they however, do not exhibit sufficient purification performance for nitrogen oxides in these "lean burn" atmospheres containing excess oxygen. Under these circumstances, the development of both a catalyst and a purifying system capable of efficiently purifying nitrogen oxides even in the atmosphere containing excess oxygen has been demanded.

U.S. Pat. No. 5,948,376 (Miyoshi) discloses one such catalyst/purifying system for purifying exhaust gases in oxygen rich atmospheres. Disclosed therein is a catalyst comprising a carrier material, such as gamma alumina, with a NOx storage component loaded on the carrier material, the NOx storage component including at least one member selected from the group consisting of alkaline-earth metals, alkali metals and rare-earth elements. The carrier material additionally has a noble metal catalyst ingredient loaded on the porous support. This catalyst functions in the following manner: (1) under a lean burn atmosphere in which oxidizing concentrations are above a stoichiometric point that is required for oxidizing components to be oxidized in the exhaust gas, a majority of the nitrogen oxides in the exhaust gas are adsorbed to the NOx storage component on the carrier material; (2) when the exhaust gas is temporarily changed from lean burn to fuel-rich in which oxygen concentrations are below stoichiometric point, the adsorbed nitrogen oxides are released and chemically reduced by a reaction with the hydrocarbons and carbon monoxide in the exhaust gas.

Specifically, Miyoshi discloses preferred embodiments that utilize a cordierite honeycomb substrate upon which is placed an Al carrier material containing $CeO_2$, a NOx storage component of Ba, La, Li, K or Na, and a noble metal catalyst of Pt or Pd.

The NOx adsorption, in the form of nitrate formation, which typically takes place under the lean conditions occurs in a low temperature window of from ~200° to 550° C., depending on the alkali and/or alkaline earth metals in the coating. NOx desorption and reduction to $N_2$ occurs in the same temperature window, but under the aforementioned rich conditions. Greater than 90% of the life of the system is spent in this temperature regime. Periodic sulfur regeneration is also needed as sulfur in the fuel leads to sulfate formation more readily than nitrate formation. Sulfates are also more stable than nitrates. Sulfur adsorption reduces the number of sites available for nitrate formation. Sulfur regeneration typically occurs under these rich conditions in a higher temperature window of from about 600° C. to 800° C., likewise depending on the alkali and/or alkaline earth metals in the coating. Less than 10% of the life of the system is spent in this high temperature regime. While the performance of NOx trap systems is thought to be quite stable at lower temperatures, temperatures in excess of 800° C. are thought to result in the reduction in the performance of the NOx adsorber.

The inventors of the present invention have discovered that one disadvantage of the present catalyst/purifying systems is that, most of the alkali metals readily react with cordierite within the temperature range of interest for NOx adsorber use. For example, potassium, which is especially desirable as an alkali adsorber material, because of its wide window of operating temperature, appears to very readily react with cordierite which draws the potassium out of the high surface area washcoat, thereby preventing it from performing its adsorber function. Further, the potassium reacts with the cordierite to form relatively high CTE phases that make the substrate and thus the catalyst system much less thermal shock resistant. The present invention has been developed in view of the aforementioned circumstances. Accordingly it is an object of this invention to provide a catalyst for purification of exhaust gases that is not subject to degradation at those higher temperatures experienced when the engine is operating under lean conditions; i.e., where the oxygen concentrations of the exhaust gases are at the stoichiometric point or more.

SUMMARY OF THE INVENTION

In accordance with a first embodiment of the present invention, there is disclosed a catalyst for purification of exhaust gases which includes (1) a catalysis-promoting coating comprising a noble metal catalyst and a NOx storage component loaded onto a carrier material, wherein the NOx storage component comprises an alkali metal and, (2) a ceramic substrate for supporting the catalysis-promoting coating, wherein the ceramic substrate resists alkali metal migration below 1000° C., and has a coefficient of thermal expansion of less than about $25 \times 10^{-7}/°$ C. (25–800° C.).

In another aspect of, the invention is a process for purifying an exhaust gas from a lean burn engine involving simultaneously removing carbon monoxide, hydrocarbons and nitrogen oxides by bringing the exhaust gas from a lean burn engine into contact with the exhaust gas purifying catalyst of the present invention disclosed above. In this process a majority of the nitrogen oxides in the exhaust gas are adsorbed to the NOx storage component on the porous support under a lean burn atmosphere in which oxidizing concentrations are above a stoichiometric point that is required for oxidizing components to be oxidized in the exhaust gas. Furthermore, when the exhaust gas is temporarily changed from lean burn to fuel-rich, the adsorbed nitrogen oxides are released and chemically reduced by a reaction with the hydrocarbons and carbon monoxide in the exhaust gas under a stoichiometric atmosphere or a fuel-rich atmosphere in which oxygen concentrations are below stoichiometric point.

Advantageously, we have found that the catalyst for purification of exhaust gases according to the present invention have improved high temperature durability up to temperatures of about 1000° C. and thus improved adsorption efficiency when compared to conventional cordierite substrate containing catalyst systems that are subject to reduced thermal and mechanical durability and decreased adsorption due to alkali, alkaline earth and rare-earth metal migration.

DETAILED DESCRIPTION OF THE INVENTION

Figure 1A:
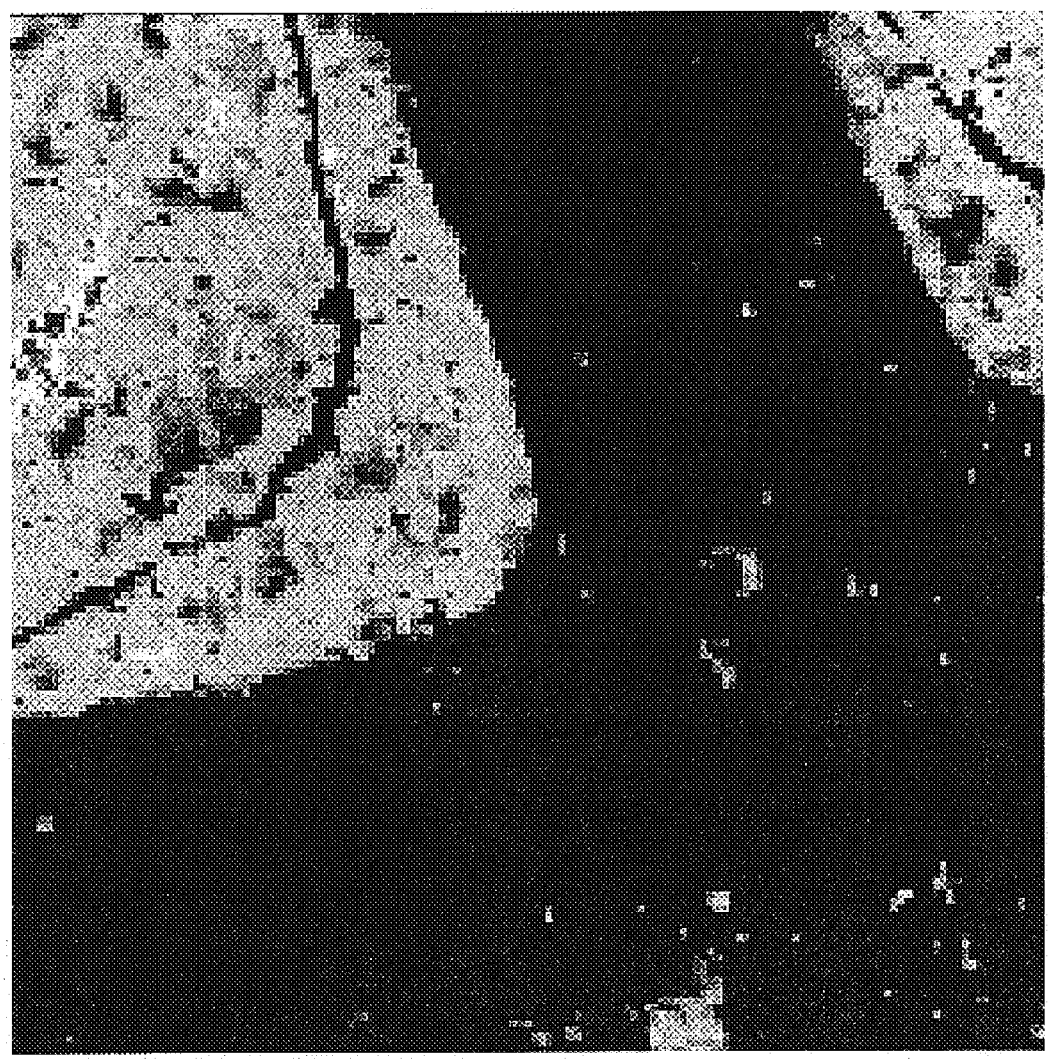
FIGS. 1a and 1b are microprobe elemental maps taken at 225× magnification of calcium aluminate support substrate washcoated with a carrier material and a potassium $NO_x$ storage component before and after aging at treatment 900° C. for 16 hours; and, FIGS. 2a and 2b microprobe elemental maps taken at 56× magnification of cordierite support substrate washcoated with a carrier material and a potassium $NO_x$ storage component before and after aging at treatment 900° C. for 16 hours.

This invention according to one aspect is, directed to a catalyst for purification of exhaust gases in oxygen-rich atmospheres, specifically those "lean" atmospheres in which oxygen concentrations of the exhaust gases are at the stoichiometric point or more required for oxidizing components such as hydrocarbons and carbon monoxide. The catalyst system includes (1) a catalysis-promoting coating comprising a noble metal catalyst and a NOx storage component loaded onto a carrier material, wherein the NOx storage component comprises an alkali metal and, (2) a ceramic substrate for supporting the catalysis-promoting coating, wherein the ceramic substrate resists alkali metal migration below 1000° C., and has a coefficient of thermal expansion of less than about $25 \times 10^{-7}/°$ C. (25–800° C.); preferably the coefficient of thermal expansion is less than about $15 \times 10^{-7}/°$ C. (25–800° C.).

Suitable substrate ceramic materials include, but are not limited to silicate and phosphate-free materials such as calcium aluminate, magnesium dititanate, iron titanate, zirconium titanate, and mixtures and solid solutions thereof. Alkali metal migration typically present in conventional cordierite support substrate-based catalyst systems is avoided presently due to the fact that these materials exhibit little or no interaction with these metals, under the conditions of the application.

Research has demonstrated that alkali metals are very reactive and react with most materials, especially with cordierite, and particularly at elevated temperatures approaching 1000° C. This mobility and interaction with support substrate materials, such as cordierite, leads to the formation of undesirable second phases that are detrimental to the catalyst system. Specifically these second phases result in the removal of the NOx storage component from the washcoat reducing the catalytic performance of the system. Further, the reaction of the NOx storage component with the substrate material leads to the formation of high CTE phases reducing mechanical durability. In contrast, the inventive substrate materials do not result in the removal of the alkali metal $NO_x$ storage component from the washcoat during high temperature use. This allows the $NO_x$ storage component to remain in the washcoat to perform its designed catalytic/adsorber function.

Preferred materials for use as the support substrate include materials with compositions selected from the group consisting, based on molar ratios, of 1:1 Calcium Aluminate (CaO):Aluminum Oxide ($Al_2O_3$), 1:2 CaO:$Al_2O_3$, and combinations thereof. In addition, the support substrate can be comprised of materials with compositions having a base system of one of the above coupled with solid solutions or second phases of various constituents selected from the group consisting of $K_2Al_2O_4$, $Li_2Al_2O_4$, $MgAl_2O_4$, ZnO, SrO and $Y_2O_3$, wherein the substitutions would be in concentrations ranging from 1–15%, by weight. Additionally, the support substrate can be comprised of a mixture of 50% $MgTi_2O_5$ and 50% $ZrTiO_4$ or mixture of 50% $Fe_2TiO_5$ and 50% $ZrTiO_4$.

The general method of producing the support substrate structures, as one skilled in the art can appreciate, is by mixing the appropriate batch materials; preferably the batch materials are powdered batch starting materials having an average particle diameter of less than about 150 micrometers, and more preferably less than about 50 micrometers. The mixture is then blended and thereafter formed into green honeycomb body, by for example, extrusion. The extruded honeycomb green body is subsequently sintered to a hard porous structure. In the manner of making the support substrate various lubricants and organic binders, such as methylcellulose, are added to the batch during the mixing step to provide viscosity control and strength during prior to firing and porosity to the after fired structure. Porosity is also dependent upon the raw materials and the firing temperature, the higher the temperature the more dense the resulting structure.

Referring to the carrier material upon which the NOx storage component and the noble metal catalyst are loaded, this material is typically in the form of a washcoat and comprises a high surface area material having a surface area of between about 10 to 300 $m^2/g$. Suitable materials include, but are not limited to, zeolite, zirconia, alpha or gamma alumina, and cerium oxide. Such washcoat materials, useful for carrying the NOx storage component and the noble metal catalyst, are well known to those skilled in the art. The choice of the particular carrier material is not critical to this invention, however gamma alumina is the preferred washcoat material.

The NOx storage component includes an alkali metal selected from the group consisting of lithium (Li), sodium (Na), potassium (K), rubidium (Rb), cesium (Cs) and francium (Fr). Potassium is the preferred $NO_x$ component as it exhibits NOx sorption efficiency at increased temperatures and over a much larger temperature range than other NOx storage components. Optionally, the NOx storage component may also include a alkaline-earth metal and a rare-earth metal.

Suitable alkaline-earth metals include barium (Ba), beryllium (Be), magnesium (Mg), calcium (Ca) and strontium (Sr). Suitable rare-earth elements include scandium (So), yttrium (Y), lanthanum (La), cerium (Ce), praseodymium (Pr) and neodymium (Nd). The noble metal catalyst ingredient is selected from group consisting of Pt, Rh and Pd.

It is preferred to load the noble metal catalyst ingredient in an amount of from 0.1 to 20 grams, further preferably from 0.5 to 10 grams, with respect to 1 liter of the porous support.

The $NO_x$ storage component and noble metal catalyst are generally mixed together with a slurry of the carrier material to form a washcoat which is thereafter applied to the support substrate. Alternatively, the carrier material can be first washcoated onto the support substrate and thereafter the NOx storage component and noble metal catalyst can be washcoated as a mixture, or as sequential washcoats, onto the support substrate having the carrier material already supported thereon. The actual method utilized to washcoat the porous support and the $NO_x$ and noble metal catalyst material is not important to the invention disclosed herein and thus any manner suitable to those skilled in the art would be acceptable. In any of these washcoat techniques, after applying the various washcoats to the support substrate, the materials are generally dried and calcined at elevated temperatures.

The internal combustion engine catalyst system of this invention may include, in addition to the catalyst system described herein, another catalyst device such as a three-way catalyst containing, for example, palladium, platinum and rhodium, or palladium and rhodium. The three-way catalyst device can be placed upstream of the $NO_x$ trap, hence closer to the engine. In such an arrangement, the three-way catalyst being closely mounted to the engine would warm up quickly and provide for efficient engine cold start emission control. Once the engine is warmed up, the three-way catalyst will remove hydrocarbons, carbon monoxide, and nitrogen oxides from the exhaust during stoichiometric operation and hydrocarbons and carbon monoxide during lean operation. The inventive catalyst system would be positioned downstream of the three-way catalyst where the exhaust gas temperature enables maximum catalyst efficiency. During periods of lean engine operation when $NO_x$ passes through the three-way catalyst, a majority of the nitrogen oxides in the exhaust gas are adsorbed to the $NO_x$ storage component on the porous support. The inventive catalyst system may be periodically regenerated by short periods or intervals of slightly rich engine operation. During this change from lean burn to fuel-rich, the adsorbed nitrogen oxides are released and chemically reduced by a reaction with the hydrocarbons and carbon monoxide in the exhaust gas under this stoichiometric or fuel-rich atmosphere. With the inventive catalyst system positioned downstream of the three-way catalyst in a more remote location relative to the engine, it is protected against very high exhaust gas temperatures that could damage the trap. It may also be considered desirable to optionally place a second three-way catalyst downstream of the inventive catalyst system trap in order to provide for efficient reduction of the $NO_x$ that which is desorbed during regeneration.

EXAMPLES

A mixture for an inventive composition was prepared by combining the following components to obtain a composition of 24.8%, by weight, CaO—75.2%, by weight, $Al_2O_3$:

---
371 $CaCO_3$ (3–4 microns APS)
629 grams $Al_2O_3$ (~4 micron APS)
50 grams of Methocel
10 grams of lubricant
200 grams of water
---

*APS—Average Particle Size

To these dry powder mixture of calcium oxide and aluminum oxide was added the listed amount of methocel binder component and these intermediate mixtures were thereafter further mixed with deionized water to form plasticized ceramic batch mixtures.

The plasticized mixture was extruded through an extruder under conditions suitable to form an approximately 3 in. long, 400 cell/$in^2$ honeycomb substrate having about 1.5 to 1.75 in. in diameter. The green honeycombs formed from the compositions were sufficiently dried to remove any water or liquid phases that might be present and thereafter subjected to a heating and firing cycle sufficient to remove the organic binder system from, and to sinter, the extruded rods and honeycombs. Specifically, the green bodies were fired to between about 1500–1600° C. and held for a period of about 8–96 hours; i.e., firing conditions suitable for forming ceramic bodies having a hard porous structure.

200 grams of gamma-alumina and 67 grams of potassium carbonate were mixed together with 400 g of distilled water to form the carrier material—$NO_x$ storage component washcoat slurry for coating on the honeycomb. Honeycomb support substrates comprised of the composition above and one example for comparison purposes comprised of a cordierite support substrate, were each immersed completely in the slurry prepared as above. Each of the washcoated samples was removed from the slurry once a consistent coating was obtained and thereafter the honeycomb was lightly shaken and blown to blow away the excess slurry. Following the removal of the excess slurry each of the coated honeycomb support substrates was dried at 90° C. for approximately 15 to 30 minutes. After drying each of the washcoated samples were calcined at 550° C. for 4 hours.

Each of the examples were then subject to an aging treatment involving subjecting the washcoated support substrate to an air atmosphere maintained at 900° C. for a period of 16 hours. The three examples were subject to WDS microprobe analysis both before and after aging. Pre- and post-aging Potassium (K) elemental maps, taken at 30,000× magnification were generated for each of the three samples so as to determine the K-rich areas in order to investigate whether any of the potassium NOx storage component material had migrated into the support substrate following aging.

Figure 1B:
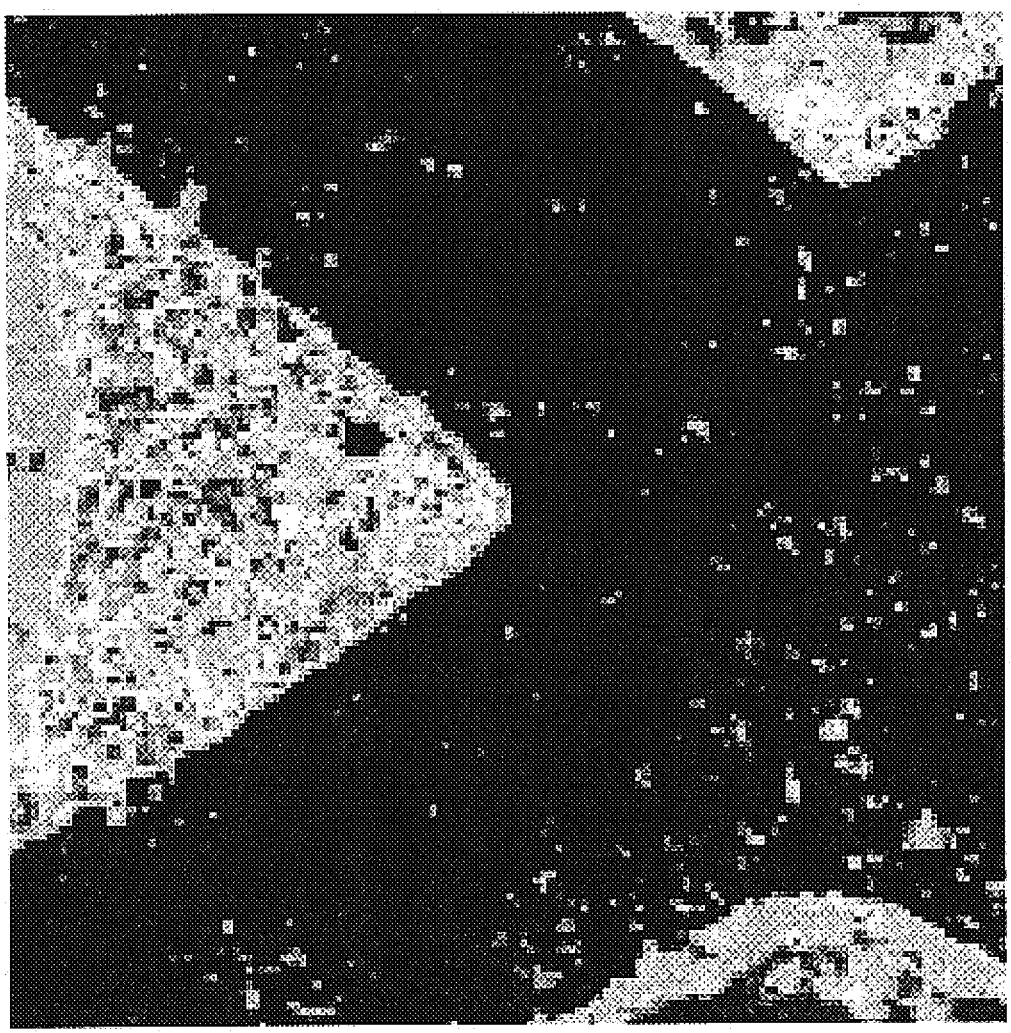

FIGS. 1 and 1a are the pre- and post-aging Potassium (K) elemental maps, respectively, for the Inventive Example, a washcoated calcium-aluminate support substrate. A comparison of FIGS. 1 and 1a, reveals no change in the location of the potassium rich area which is the gray or lighter area on the drawings; the black or dark area is the substrate. Therefore the potassium has remained in virtually the same location—the washcoat layer, after the aging treatment. This is evidence that there is no migration of the potassium NOx storage component material away from the washcoat into the substrate that would potentially reduce the thermal and mechanical durability of the substrate or result in a reduction of the catalyst efficiency.

Figure 2A:
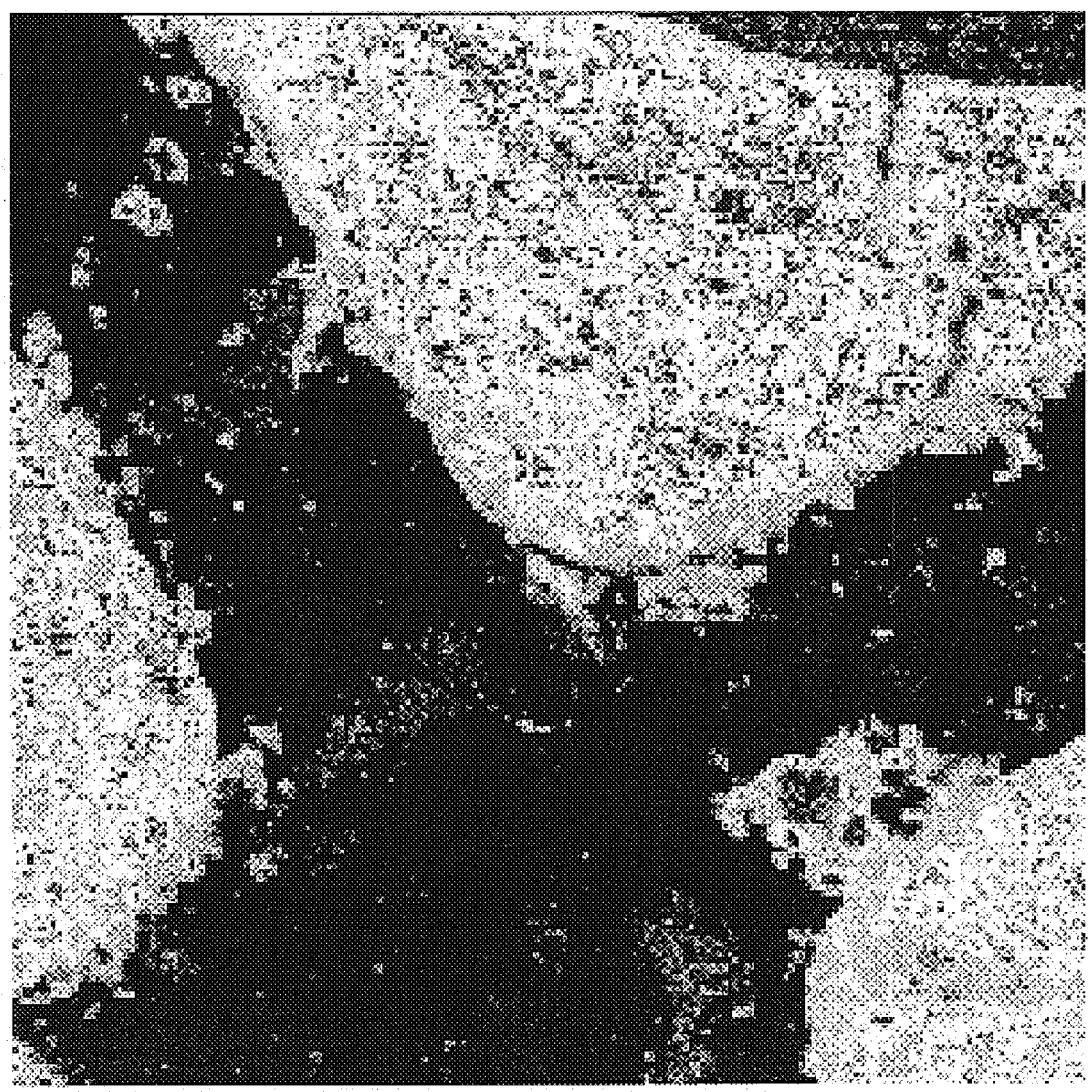
Figure 2B:
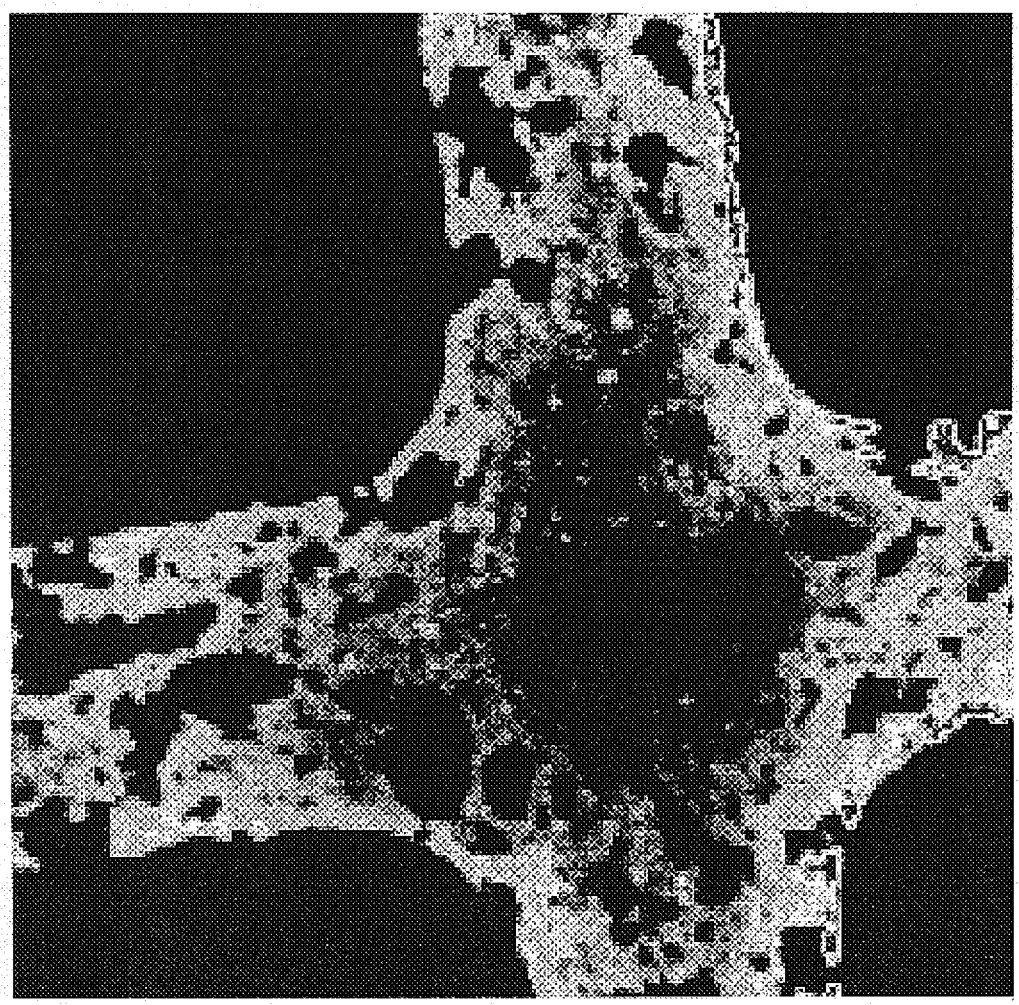

FIGS. 2a and 2 are the pre- and post-aging Potassium (K) elemental maps, respectively, for the Comparative Example, a washcoated cordierite support substrate. Contrary to the calcium aluminate washcoated support substrate, a comparison of FIGS. 2a and 2b reveal that almost all of the potassium (K) NOx storage component material has migrated from the washcoat into the support substrate. Specifically, in FIG. 2a the substrate appears the dark or black region on the elemental map, whereas in FIG. 2b the substrate is now gray or bright, evidence that of K migration.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A catalyst for purification of exhaust gases in oxygen-rich atmospheres in which oxygen concentrations of the exhaust gases are at the stoichiometric point or more required for oxidizing components to oxidized therein, consisting essentially of:

(1) a catalysis-promoting coating comprising a noble metal catalyst and a NOx storage component loaded onto a carrier material, wherein the NOx storage component comprises an alkali metal and, (2) a ceramic substrate for supporting the catalysis-promoting coating, wherein the ceramic substrate exhibits resistance to alkali metal migration below 1000° C., and a coefficient of thermal expansion of less than about $25 \times 10^{-7}/°$ C. (25–800° C.).

wherein the ceramic substrate comprises a silicate and phosphate free material selected from the group consisting of calcium aluminate, magnesiun dititanate, iron titanate zirconium titanate, and mixtures and solid solutions thereof; and wherein the material further includes a second phase formed with constituents selected from the group consisting of $K_2Al_2O_4$, $Li_2Al_2O_4$, $MgAl_2O_4$, ZnO, SrO and $Y_2O_3$.

2. The catalyst according to claim 1 wherein the substrate comprises a mixture of 50% $Fe_2TiO_5$ and 50% $ZrTiO_4$.

3. The catalyst according to claim 2 wherein the substrate comprises a mixture of 50% $MgTi_2O_5$ and 50% $ZrTiO_4$.

* * * * *